Nov. 24, 1925.
G. F. COLBERT ET AL
1,563,018
MIRROR
Filed Sept. 13, 1921
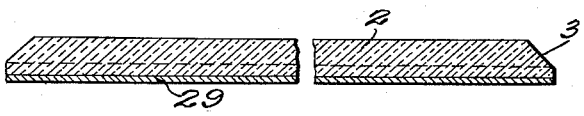
INVENTORS
George F. Colbert
and William H. Colbert
By Roy Follin Brown
atty Patented Nov. 24, 1925.

1,563,018

UNITED STATES PATENT OFFICE.

GEORGE F. COLBERT AND WILLIAM H. COLBERT, OF PITTSBURGH, PENNSYLVANIA.

MIRROR.

Application filed September 13, 1921. Serial No. 500,290.

*To all whom it may concern:*

Be it known that we, GEORGE F. COLBERT and WILLIAM H. COLBERT, citizens of the United States, and residents of Pittsburgh, in the county of Allegheny and State of Pennsylvania, have invented a new and useful Improvement in Mirrors; and we do hereby declare the following to be a full, clear, and exact description thereof.

Our invention relates to mirror supports and it has special reference to rear-view automobile mirrors which are attached in convenient position at the front of the car so that the driver can obtain a view of the roadway in the rear. It will be understood, however, that our invention is not limited to this particular purpose.

The object of our invention is to improve the construction of mirrors that are to be exposed to severe conditions of handling and vibration by protecting the back of the mirror with a waterproof backing of sheet material.

In the accompanying drawing the figure is an edge view of a mirror made in accordance with our invention.

The mirror may be held in a suitable holder (not shown), and is provided with a waterproof backing of sheet material. This backing is shown at 29, and may consist of leather, leatherette, paperette, waterproof cloth, or any other suitable material attached to the whole rear surface of the mirror by means of an adhesive which is preferably of a waterproof nature. We are aware that mirrors have been backed with paint and other liquid coating compositions, but we believe that we are the first to provide a mirror for use on automobiles and in other places where moisture is encountered, having a waterproof backing which protects the mirror from being damaged by dampness, and also protects the occupants of the automobile from being injured if the mirror is shattered in a collision or other accident.

We claim as our invention:

A mirror for use on automobiles and for similar purposes consisting of sheet glass having a reflecting coating on its rear surface and a protective backing of waterproof sheet material applied to the said reflecting surface by means of a waterproof adhesive, the said sheet material being substantially coextensive with the said rear surface.

In testimony whereof, we, the said GEORGE F. COLBERT and WILLIAM H. COLBERT, have hereunto set our hands.

GEORGE F. COLBERT.
WILLIAM H. COLBERT.